United States Patent [19]

Griffith

[11] 4,072,324
[45] Feb. 7, 1978

[54] SHEAR PIN ASSEMBLY FOR COUNTERWEIGHTS

[75] Inventor: Bobby D. Griffith, Aurora, Ill.

[73] Assignee: Caterpillar Tractor Co., Peoria, Ill.

[21] Appl. No.: 715,742

[22] Filed: Aug. 19, 1976

[51] Int. Cl.² ............................................. B60R 11/00
[52] U.S. Cl. ................................................... 280/759
[58] Field of Search ................ 280/759, 515; 248/364, 248/408, 409; 403/154, 155, 317, 318

[56] References Cited

U.S. PATENT DOCUMENTS

| | | | |
|---|---|---|---|
| 1,848,338 | 3/1932 | Garrow | 248/408 X |
| 2,293,144 | 8/1942 | Jones | 248/408 |
| 3,854,774 | 12/1974 | Limpach | 248/408 X |
| 3,902,735 | 9/1975 | Bertram et al. | 280/759 |

Primary Examiner—Richard A. Bertsch
Attorney, Agent, or Firm—Phillips, Moore, Weissenberger, Lempio & Majestic

[57] ABSTRACT

A counterweight mounting assembly has a counterweight mounted thereon and a shear pin is extended to dispose it in aligned bores formed in the counterweight and in the frame of the vehicle. When the counterweight is lowered for removal from the vehicle, the operator first pulls on a handle secured to the shear pin to retract the shear pin into a stored position within the counterweight. First and second stops are provided between the counterweight and the shear pin to hold the shear pin at each of its extended and retracted positions.

10 Claims, 4 Drawing Figures

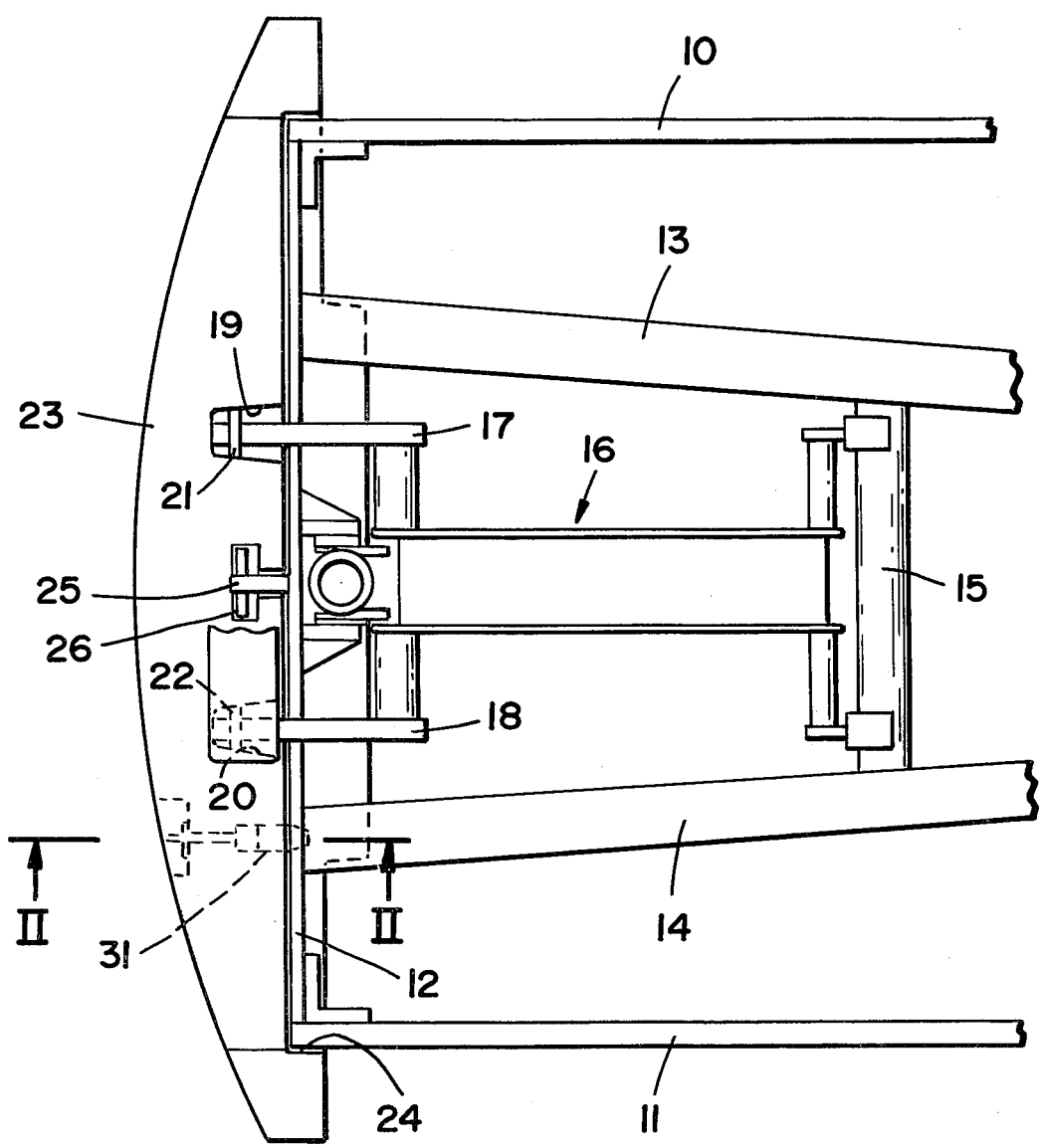
FIG _ 1

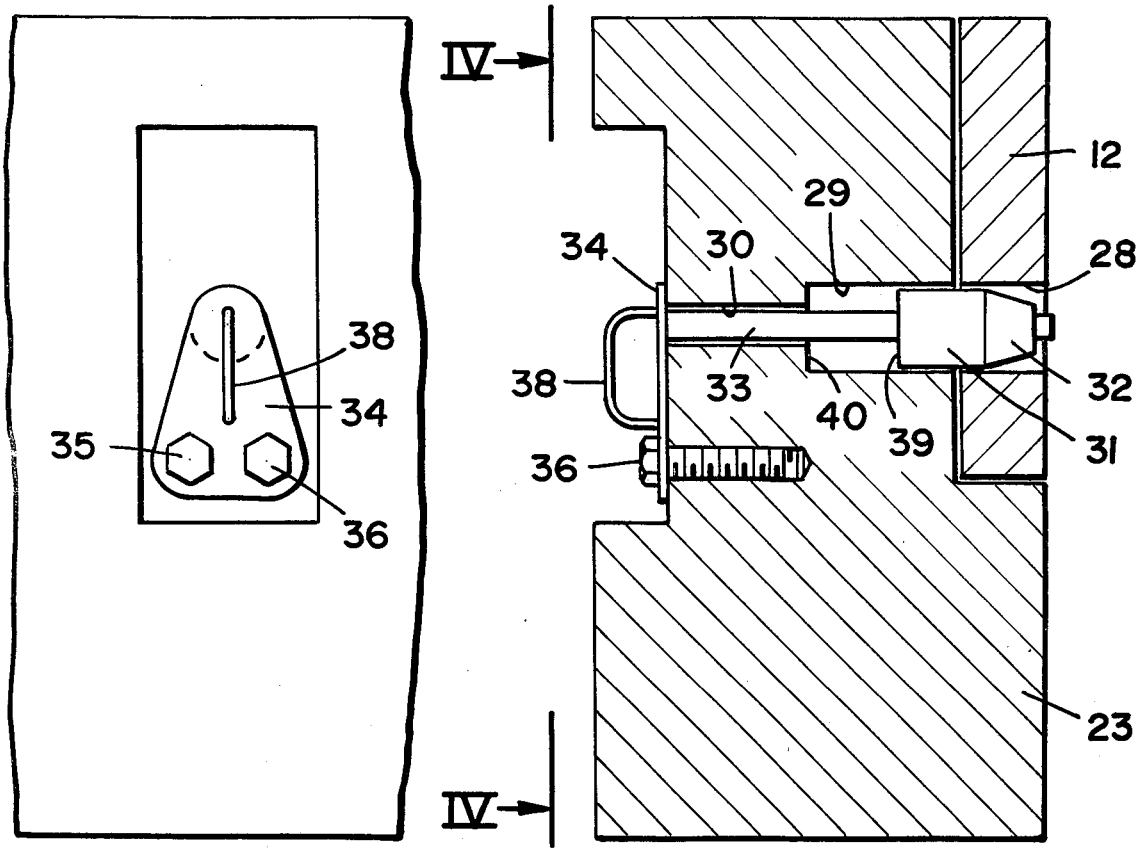
FIG _ 4    FIG _ 2
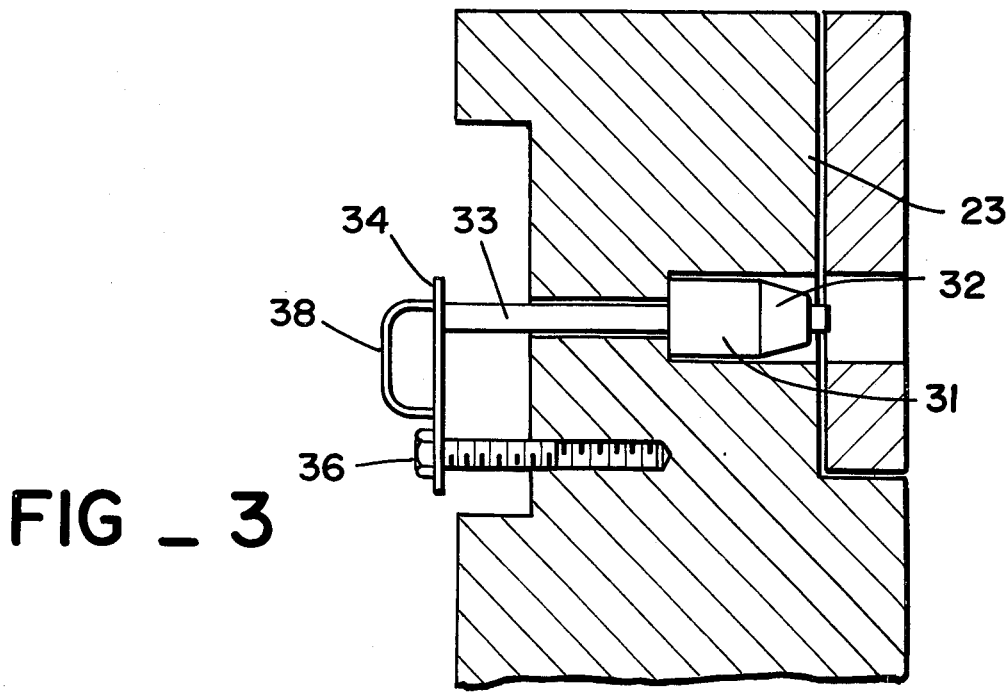
FIG _ 3

SHEAR PIN ASSEMBLY FOR COUNTERWEIGHTS

BACKGROUND OF THE INVENTION

Construction machines, such as hydraulic excavators, loaders and the like, normally have a counterweight attached rearwardly thereon to counterbalance the weight of the bucket or other work implement mounted forwardly thereon. One example of such counterweights is shown in U.S. Pat. No. 3,902,735, assigned to the assignee of this application. The counterweight disclosed therein is detachably mounted on a frame of the vehicle so that the counterweight can be removed from the vehicle when being transported from one job site to another. One problem encountered with such a prior art counterweight arrangement is that the shear pin and attendant bolts for securing the counterweight to the frame of the vehicle frequently become lost when detached from the vehicle.

SUMMARY OF THE INVENTION

An object of the present invention is to provide an improved shear pin assembly adapted to aid in precisely attaching a counterweight on a vehicle and further adapted to be stored in the counterweight when not in use. The shear pin assembly comprises a shear pin reciprocally mounted in a bore formed in the counterweight for movement between an extended position for engaging an aligned bore formed in a frame of a vehicle and a retracted or stored position within the counterweight. First and second stop means are provided between the counterweight and the shear pin to hold the shear pin at its extended and retracted positions, respectively.

BRIEF DESCRIPTION OF THE DRAWING

Other objects of the present invention will become apparent from the following description and accompanying drawings wherein:

FIG. 1 is a top plan view of a portion of a frame of a vehicle and a counterweight mounting assembly attached on the frame;

FIG. 2 is an enlarged view, taken in the direction of arrows II—II in FIG. 1, and illustrating a shear pin assembly of this invention in its extended position for supporting a counterweight on the vehicle;

FIG. 3 is a view similar to FIG. 2, but showing the shear pin assembly in a retracted position; and FIG. 4 is a view taken in the direction of arrows IV—IV in FIG. 2.

DETAILED DESCRIPTION

FIG. 1 of the drawings illustrates a portion of a vehicle frame having a counterweight mounting assembly attached thereon. The details of construction and operation of such assembly are fully described in U.S. Pat. No. 3,902,735, referenced above. The vehicle frame has a pair of laterally spaced side rails 10 and 11 secured together by a cross rail 12 and further secured to a pair of main rails 13 and 14.

A tubular cross member 15 is secured between the frame members and has the forward end of a lift arm assembly 16 of the counterweight mounting assembly pivotally mounted thereon, as described in U.S. Pat. No. 3,902,735. The lift arm assembly includes a pair of arms 17 and 18 having hook means formed on the outer ends thereof. The hook means extend into cavities 19 and 20 for engaging pins 21 and 22, respectively, for lifting a counterweight 23 into position with respect to the vehicle. The counterweight has a cavity 24 formed therein to receive cross rail 12 when the counterweight is lifted into position, as shown in FIGS. 1 and 2, for connection to the vehicle frame. A T-bar 25 is secured to the vehicle frame and extends into an accommodating T-shaped slot 26 formed within and extending from the upper surface of the counterweight to prevent tipping of the counterweight.

Referring to FIG. 2, a shear pin assembly 27 is shown in a locked position for retaining counterweight into its raised position vertically with respect to the vehicle frame. A first bore 28 extends through cross rail 12 whereas a second bore 29, having substantially the same diameter, is formed in the counterweight. As shown, the bores are disposed in co-axial relationship when the counterweight is lifted.

A third bore 30, having a smaller diameter than that of bore 29, extends coaxially therewith and to the opposite side of the counterweight. A shear pin member 31 is slidably mounted in bore 29 and is adapted to be moved therein from its retracted position shown in FIG. 3 to its extended position shown in FIG. 2. The shear pin includes a cylindrical body portion having a frustoconically shaped and self-centering end 32 adapted to extend into bore 28 when the shear pin is extended.

A central bore is formed through the shear pin to receive a rod 33 which is secured therein. The rod extends rearwardly through bore 30 and has a triangular plate 34 (FIG. 4) secured to the outer end thereof. The plate is constructed and arranged to provide a first stop means for limiting rightward movement of shear pin 31 in FIG. 2, upon its engagement with counterweight 23.

Adjustable locking means in the form of a pair of bolts 35 and 36 extend through plate 34 and are threadably mounted on the counterweight to permit the shear pin assembly to be moved between its FIGS. 2 and 3 positions. A C-shaped handle 38 is secured to the outboard surface of plate 34 and is adapted to be grasped by the hand of an operator to effect such selective movement. A second stop means, comprising an annular surface 39 formed on shear pin 31 and an axially opposed surface 40 formed in the counterweight to define an end of bore 29, limits leftward movement of the shear pin, as shown in FIG. 3.

It will be seen from the above description that shear pin 31 is movable between its FIG. 2 extended position for supporting the counterweight and its FIG. 3 retracted and storage position. In the latter position, the counterweight may be dropped vertically from the vehicle frame upon disengagement of pins 21 and 22 from the hook means formed on the ends of arms 17 and 18 for permitting the removal of the counterweight. Thus, the shear pin assembly can be fully disengaged from rail 12 of the vehicle frame and yet remain attached to the counterweight in a stored position for subsequent use. It should be understood that more than one shear pin assembly could be utilized for selectively mounting and supporting the counterweight on the vehicle frame.

What is claimed is:

1. A shear pin assembly in combination with a counterweight adapted for mounting on a frame of a vehicle comprising a shear pin reciprocally mounted in a bore formed in said counterweight for movement in first and second opposite directions between an extended position whereby an end of said shear pin extends outwardly from said counterweight and a retracted position within said counterweight, first stop means for limiting movement of said shear pin in said first direction to hold it in its extended position, second stop means for limiting movement of said shear pin in said second direction to hold it in its retracted position and adjustable locking means separate and offset from said shear pin and mounted solely on said counterweight and attaching said shear pin to said counterweight for selectively locking said shear pin at its extended or retracted position thereon.

2. The shear pin assembly of claim 1 further comprising handle means secured to said shear pin for selectively moving it between its extended and retracted positions.

3. The shear pin assembly of claim 1 wherein said adjustable locking means comprises at least one bolt threadably attached to said counterweight.

4. The shear pin assembly of claim 3 further comprising a rod secured to said shear pin and extending through another bore formed through said counterweight which communicates in axial alignment with said first-mentioned bore, said bolt extending through a plate secured to said rod.

5. The shear pin assembly of claim 4 further comprising a handle secured to an outboard side of said plate.

6. The shear pin assembly of claim 1 wherein an end of said shear pin is frustoconically shaped.

7. The shear pin assembly of claim 1 wherein said first stop means comprises a plate secured to said shear pin and adapted to engage an outboard side of said counterweight when said shear pin is in its extended position.

8. The shear pin assembly of claim 1 wherein said second stop means comprises an annular surface formed on an end of said shear pin and an axially opposed surface formed in said counterweight.

9. A vehicle comprising
a frame,
a counterweight mounting assembly attached on said frame,
a counterweight removably mounted on said mounting assembly, and
a shear pin assembly mounted on said counterweight comprising
a shear pin reciprocally mounted in a bore formed in said counterweight for movement in first and second opposite directions between an extended position whereby an end of said shear pin extends outwardly from said counterweight and a retracted position within said counterweight, first stop means for limiting movement of said shear pin in said first direction to hold it in its extended position, second stop means for limiting movement of said shear pin in said second direction to hold it in its retracted position and adjustable locking means separate and offset from said shear pin and mounted solely on said counterweight and attaching said shear pin to said counterweight for selectively locking said shear pin at its extended or retracted position thereon.

10. The vehicle of claim 9 wherein a bore is formed in the frame of said vehicle and wherein an end of said shear pin is movable disposed in such bore.

* * * * *